United States Patent Office 2,822,367
Patented Feb. 4, 1958

2,822,367

PRODUCTION OF THIAZOLE SULFENAMIDES

Glen Alliger, Akron, Ohio, assignor to The Firestone Tire & Rubber Company, Akron, Ohio, a corporation of Ohio No Drawing. Application July 18, 1956
Serial No. 598,504

8 Claims. (Cl. 260—306.6)

This invention relates to a new method of making arylene-thiazole sulfenamides, involving as intermediates a new class of compounds, the arylene-thiazolyl sulfenyl thiocyanates.

Sulfenamides of the type mentioned have heretofore usually been prepared by oxidizing a mixture of an amine and a solution of the sodium salt of a 2-mercapto-arylene-thiazole. It is an object of the invention to provide a novel method of making this class of sulfenamides. Another object is to provide a novel class of thiocyanates, which serve as intermediates in the process. Other objects will become apparent in the description of the invention which follows.

In accordance with the present invention it has been found possible to produce a novel class of thiocyanates by allowing thiocyanogen to react with a 2-mercapto-arylene-thiazole or its disulfide. It has also been discovered that a member of this class of thiocyanates reacts with an amine having a hydrogen atom attached to the amino nitrogen atom thereof to produce the corresponding arylene thiazole sulfenamide. The invention is illustrated by the following examples.

EXAMPLE 1

*2-benzothiazolylsulfenyl-thiocyanate*

An ether solution of thiocyanogen $(SCN)_2$, was prepared as usual—by addition of bromine to an ice cold suspension of lead thiocyanate in ether. To this end lead thiocyanate, 17.7 grams (0.05 mole+10%), was suspended in 125 ml. of ether in an ice bath, and 8 grams (0.05 mole) of bromine was added with stirring. The resulting ether solution of thiocyanogen was decanted from the precipitated lead bromide and was then slowly added with stirring to a solution of 6.7 grams (0.04 mole) of 2-mercaptobenzothiazole in 500 ml. of ether, at 0° C. The yellow solid which separated was removed by filtration, dried and weighed. The yield of 2-benzothiazolyl-sulfenyl-thiocyanate so obtained was 8 grams, melting at 170° to 185° C. with decomposition.

EXAMPLE 2

*N-isopropyl-2-benzothiazole sulfenamide*

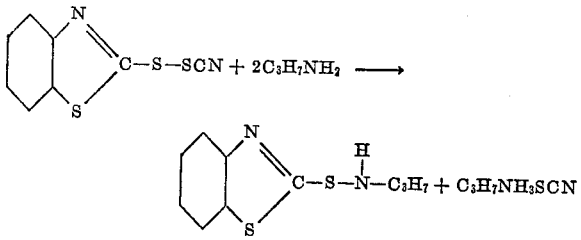

2-benzothiazolylsulfenylthiocyanate, 2.24 grams (0.01 mole).
Isopropylamine 2.5 ml. (0.02 mole+50% excess).
Absolute ether, 50 ml.

The amine was dissolved in the ether and cooled in an ice bath. The sulfenylthiocyanate, produced in Example 1, was added with stirring and shaking. An oily solid separated and was removed by adding water, shaking, separating the aqueous layer and discarding it. The ether layer was dried, and the ether was evaporated to deposit an oily crystalline residue, weighing 2 grams. The residue was triturated with 15 to 20 ml. of ether. The undissolved solid melted at 170–175° C. to a red liquid. The ether solution was evaporated partially and cooled to 0° C. Crystals separated which melted at 92–95° C. A mixed melting point with authentic N-isopropyl-2-benzothiazole sulfenamide (G. E. P. Smith, Jr., 2,415,029) was 95–96° C., showing the two substances to be identical.

Mono-tertiary-butylamine can be substituted for isopropylamine in this example to produce a good yield of N-tert-butyl-2-benzothiazole sulfenamide.

EXAMPLE 3

*N-cyclohexyl-2-benzothiazole sulfenamide*

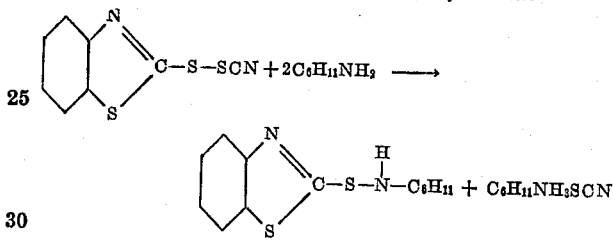

2-benzothiazolylsulfenylthiocyanate, 2.24 grams (0.01 mole).
Cyclohexylamine, 0.02 mole+3 ml. (130% excess).
Absolute ether, 50 ml.

The cyclohexylamine was dissolved in the ether, and the sulfenylthiocyanate was added slowly and with shaking. The mixture was shaken for 30 minutes after all the thiocyanate had been added. Then the ether solution was separated from a solid precipitate by filtration. The ether was evaporated from the filtrate to leave an oily solid residue, and the latter was triturated with alcohol and filtered. The white crystalline residue, after drying, melted at 98–101° C. A mixed melting point with authentic N-cyclohexyl-2-benzothiazole sulfenamide (E. L. Carr 2,354,427) melting at 98–101° C. was 98–101° C., showing the two substances to be identical.

Other examples of primary amines operative in the process of the invention are methylamine, ethylamine, n-propylamine, n-butyl-amine, isobutylamine, sec-butyl-amine, n-amylamine, sec-amylamine, tert-amylamine, iso-amylamine, sec-isoamylamine, neopentylamine, sec-butylcarbinamine, and the various higher homologs, including, without limitation thereto, the hexylamines, the heptylamines, the octylamines, the nonylamines, the decylamines, the dodecylamines, the hexadecylamines, the octadecylamines; cyclopentylamine, the methylcyclopentylamines, the methylcyclohexylamines; aniline and the ring-substituted anilines. Secondary amines also react with the novel thiocyanates in the same manner, examples of this type of amine being dimethylamine, diethylamine, methylethylamine, di-n-propylamine, di-isopropylamine, di-n-butylamine, di-isobutylamine, di-n-amylamine, di-isoamylamine, the dihexylamines, the di-octylamines, dicyclohexylamine, morpholine, piperidine, pyrrolidine, N-phenyl, cyclohexylamine and diphenylamine.

The invention comprehends other arylene-thiazolyl sulfenyl thiocyanates than that used in Examples 2 and 2. Suitable thiocyanates can be produced in the method of Example 1 from 2-mercapto-4-phenyl-benzothiazole, 2-mercapto-6-phenyl-benzothiazole, 2-mercapto naphthothiazole and the homologs or various unreactive ring substitution products of these substances; typical ring substituents of this type are nitro, halogen and alkoxyl groups. Reagents alternative to the mercaptans mentioned above are their corresponding disulfides ordinarily produced by gentle oxidation of the mercaptans; thus the disulfide corresponding to the mercaptan of Example 1, 2,2'-dithiobis-benzothiazole, reacts with thiocyanogen to produce the same thiocyanate.

What is claimed is:

1. Method of producing a thiazole sulfenamide, comprising reacting an arylene-thiazolyl sulfenyl thiocyanate with an amine possessing at least one hydrogen atom attached to the amino nitrogen atom thereof.
2. Method of producing a thiazole sulfenamide, comprising reacting 2-benzothiazolyl sulfenyl thiocyanate with an amine possessing at least one hydrogen atom attached to the amino nitrogen atom thereof.
3. Method of producing a thiazole sulfenamide, comprising reacting an arylene-thiazolyl sulfenyl thiocyanate with a primary amine.
4. Method of producing a thiazole sulfenamide, comprising reacting an arylene-thiazolyl sulfenyl thiocyanate with an aliphatic primary amine.
5. Method of producing a thiazole sulfenamide, comprising mixing a 2-benzothiazolyl sulfenyl thiocyanate with a cycloalkyl primary amine and allowing the two substances to react.
6. Method of making N-isopropyl-2-benzothiazole sulfenamide, comprising mixing 2-benzothiazolyl sulfenyl thiocyanate with isopropylamine and allowing the two substances to react.
7. Method of making N-tert-butyl-2-benzothiazole sulfenamide, comprising reacting 2-benzothiazolyl sulfenyl thiocyanate with tert-butylamine.
8. Method of making N-cyclohexyl-2-benzothiazole sulfenamide, comprising reacting 2-benzothiazolyl sulfenyl thiocyanate with cyclohexylamine.

References Cited in the file of this patent

Adams et al.: "Org. Reactions," vol. III, pp. 251–4, 266 (1946).

Lecher et al.: Ber. Deut. Chem., vol. 55, pp. 1474–79 (1922).